United States Patent
Rieck (10) Patent No.: US 6,591,853 B1
(45) Date of Patent: Jul. 15, 2003

(54) COMBINATION UN-GALVANIZED AND GALVANIZED MANIFOLD ASSEMBLY AND MANUFACTURING METHOD

(76) Inventor: Bruce F. Rieck, 1609 Watchhill Rd., Austin, TX (US) 78703

( * ) Notice: Subject to any disclaimer, the term of this patent is extended or adjusted under 35 U.S.C. 154(b) by 0 days.

(21) Appl. No.: 09/922,401

(22) Filed: Aug. 3, 2001

(51) Int. Cl.⁷ .............................................. F16K 51/00
(52) U.S. Cl. .................... 137/15.18; 251/148; 251/143; 29/890.124; 29/890.128
(58) Field of Search ................................ 251/148, 368, 251/151, 143; 29/890.128, 890.124; 137/15.18, 15.22, 15.24, 15.25

(56) References Cited

U.S. PATENT DOCUMENTS

| | | | |
|---|---|---|---|
| 3,647,178 A | * | 3/1972 | Adams ........................ 251/148 |
| 4,429,903 A | * | 2/1984 | Baker .......................... 285/24 |
| 4,552,332 A | * | 11/1985 | Sonderegger et al. ........ 251/148 |
| 6,202,981 B1 | * | 3/2001 | Davis et al. ................. 251/143 |

* cited by examiner

*Primary Examiner*—Kevin Lee
(74) *Attorney, Agent, or Firm*—Russell D. Culbertson; Shaffer & Culbertson, L.L.P.

(57) ABSTRACT

An un-coated valve (11) is connected between a first and a second pipe component (12, 12a). Each pipe component (12, 12a) includes a length of a pipe (21, 21a) with a flange (22, 22a) that is secured at one end. The valve (11) is positioned between the two pipe components (12, 12a), forming a first and a second sealing connection between the valve (11) and the pipe components (12, 12a). Each sealing connection is made between a valve sealing surface (25, 25a) and the flange (22, 22a) on the respective pipe component (12, 12a).

19 Claims, 6 Drawing Sheets

COMBINATION UN-GALVANIZED AND GALVANIZED MANIFOLD ASSEMBLY AND MANUFACTURING METHOD

TECHNICAL FIELD OF THE INVENTION

This invention relates to pipe or tubing assemblies. More particularly, the invention relates to an assembly having un-coated components connected to galvanized or otherwise coated steel pipe using flanged connections. The invention encompasses a valve and pipe assembly that includes an un-flanged valve connected between two flanged pipe components. The invention also encompasses a method for manufacturing a valve and pipe assembly made of coated and un-coated components.

BACKGROUND OF THE INVENTION

Valve and pipe assemblies are used in many applications, and particularly in industrial applications. A manifold is a common example of a valve and pipe assembly having wide industrial application. Manifolds are made up of a number of pipe segments interconnected with valves which are used to control the direction or route of fluid flow through the various pipe segments. For example, a manifold may include two fluid input points and two fluid output points. The valves in this example manifold may be arranged to selectively direct fluid from either input to either output, combine two input streams and direct the mixed stream to a single output, split a single input stream into two output streams, or completely block flow between either input and either output.

Various types of connections may be used to interconnect the pipe segments and valves in a manifold or other valve and pipe assembly. For example, a valve in a valve and pipe assembly may be connected to the adjacent pipe segments through threaded connections or flanged connections. A threaded connection uses threads on each end of the valve and on each pipe end. Making the connection requires rotating the valve with respect to the pipe segments or rotating the pipe segments with respect to the valve in order to thread the valve and pipe segments together. In a flanged connection between a valve and two pipe segments, the valve includes a flange at each end and each pipe segment end also includes a corresponding flange. The flange connection is made by aligning each flange on the valve with a different pipe flange and then bolting the flanges together, usually with an O-ring sealing element sandwiched between the opposing flange faces. Alternatively to threading or flanging a valve between two pipe segments, a valve may also be welded between two pipe segments to form a permanent connection. Welding requires that the valve and pipe segments meet or fit together in a position suitable for accepting a weld.

In many industrial applications, valve and pipe assemblies are used in corrosive environments. Manifolds and other pipe assemblies used in these corrosive environments must be manufactured from corrosive resistant materials or protected with corrosive resistant coatings. For example, both the pipe segments and valves in a valve and pipe assembly may be made of corrosive resistant materials such as stainless steel. Alternatively to forming the various valves and pipes in an assembly from corrosive resistant materials, the various components may be made of galvanized or coated carbon steel. Galvanized carbon steel has a protective outer layer of zinc which is deposited on the steel in a separate galvanization process after the steel is formed. In addition to galvanizing, other protective coatings may be used to protect carbon steel used in corrosive environments.

The choice of connections and choice of materials used in a valve and pipe assembly will depend upon a number of factors including the pressures to which the assembly will be subjected and the environment in which the assembly will be used. Corrosion resistant components such as stainless steel or galvanized steel must be used where the assembly will be subjected to corrosive environments. Flanged or welded connections are generally preferred for high pressure applications, and may be required by industry standards even for low pressure applications. However, welded connections should not be used for previously coated steel components because welding destroys the coating in the area of the weld and leaves the weld joint unprotected. Also, the heat of welding may release dangerous gases from some coatings, especially the zinc coatings of galvanized components.

An entire valve and pipe assembly may be made from flanged stainless steel components to accommodate high pressures or industry standards and to withstand corrosive environments. However, it is desirable to avoid using stainless steel components whenever possible in order to avoid the expense of stainless steel components. Using coated carbon steel pipe segments in a valve and pipe assembly such as a manifold may greatly reduce the cost of the manifold as compared to using stainless steel pipe segments. The cost of the assembly could be reduced further by eliminating stainless steel or carbon steel valves and instead using less expensive valve components.

Bronze valves are a desirable alternative to steel valves in many applications because bronze valves are much less costly than both carbon steel and stainless steel valves and because bronze valves provide excellent resistance to corrosion. Prior to the present invention, however, bronze valves posed problems in applications where welded or flanged connections were required. Bronze valves are typically manufactured with threaded connections and not with flanges. Thus, a bronze valve would have to be welded to the pipe segments or be specially manufactured with flanges. Having bronze valves specially manufactured would increase the cost of the valves and defeat the primary purpose of using bronze valves over steel valves. Also, welding the bronze valves in place is not possible using conventional welding techniques. Therefore, it has not been practical to use bronze valves and steel pipe to form a flanged or welded valve and pipe assembly, especially where the assembly is to be used in corrosive environments requiring any carbon steel components to be durably coated.

SUMMARY OF THE INVENTION

It is an object of the invention to provide a valve and pipe assembly which overcomes the above-described problems associated with valve and pipe assemblies which are subjected to corrosive environments and require flanged or welded connections. More particularly, it is an object of the invention to provide a valve and pipe assembly having an unflanged valve which is connected in a line of flanged pipe, especially flanged pipe which is pre-coated. It is another object of the invention to provide a method for connecting an unflanged valve with the coated pipe.

A valve and pipe assembly according to the invention includes a valve, a first pipe component, and a second pipe component. Each pipe component includes a length of pipe having a flange secured at one end. Rather than including flanges, the valve includes a first valve sealing surface at a first end and a second valve sealing surface at a second end. The valve is positioned between the two pipe components with the first valve sealing surface facing the flange associated with one pipe component and the second valve sealing surface facing the flange associated the other pipe component. A flange connector arrangement, preferably comprising a number of bolts (two or more) extending between the two pipe component flanges, connects the two flanges together with the valve component sandwiched in between. This connection between the two pipe component flanges produces two sealing connections. A first sealing connection is formed between the first valve sealing surface and the flange that it abuts, and a second sealing connection is formed between the second valve sealing surface and the flange that it abuts.

Perhaps the most important benefit of the valve and pipe assembly according to the present invention is that the assembly allows an inexpensive, unflanged bronze valve to be connected to two flanged pipe segments that are protected from corrosion with a durable coating such as galvanizing. Any welding required to produce the two pipe components may be performed before the pipe is coated. Thus, the coating on the pipe components and their associated flanges remains substantially intact to protect the underlying steel. The valve and pipe assembly is therefore well suited for use in corrosive environments and can be used in place of the much more expensive assemblies using all stainless steel components or mixtures of stainless steel components and galvanized steel components.

Where the flanged pipe segments require a coating for corrosion protection, the invention is particularly suited for situations in which the flanged pipe segments are coated with a material or in a process incompatible with the valve. This is the case where the valve is a bronze valve and the flanged pipe segments must be galvanized or coated in some other process that subjects the material to harsh chemicals and/or high temperatures. In these situations, it is not possible to simply make the assembly and apply the coating to the entire assembly. Rather, the parts to be coated must be coated prior to connecting the assembly. The preferred manufacturing process, which includes coating the flanged pipe segments prior to making the assembly, will be discussed in detail with reference to FIGS. 4–9 below.

The valve component used in the a valve and pipe assembly according to the invention may include positioning features on its exterior surface which may cooperate with one or more of the flange bolts to limit any rotation of the valve with respect to the two pipe components. The required cooperation may be achieved by using a minimum clearance between the flange bolts and the outside diameter of the pipe of the two pipe components. This minimum clearance places the flange bolts close to the valve body in position to contact the positioning features and thus prevent the valve body from rotating with respect to the two pipe components.

In the preferred form of the invention, each pipe component includes an alignment tube extending past the sealing face of the respective flange. These alignment tubes are inserted into the bore on either end of the valve and ensure that the valve is in the proper position to produce the sealing connections required against the respective pipe flanges at each end of the valve. The base of each alignment tube also preferably helps form an area for receiving an O-ring which helps facilitate the seal at each end of the valve body.

The method of manufacturing a valve and pipe assembly according to the invention includes welding a first flange to a first pipe to form a first component and welding second flange to a second pipe to form a second component. After coating the first and second components, the method includes machining flange sealing surfaces on each flange so that a good sealing connection can be made with the valve sealing surfaces. Once the flange sealing surfaces are machined, the method includes aligning the valve in a connected position between the first flange sealing surface and the second flange sealing surface and then connecting the two flanges together to produce the desired sealing connections between the sealing surfaces at each end of the valve and the respective pipe flanges. These seals may result from the direct contact between the valve material and the flange material or through an intermediate material such as an O-ring positioned between the respective valve sealing surface and flange sealing surface.

The preferred form of the invention includes welding the flanges on the respective pipes so that the bolt holes for receiving the flange connecting bolts can reside as close as possible to the outside surface of the pipe. This close spacing between the flange bolt holes and the pipe outside surface helps facilitate the desired cooperation between the flange bolts and positioning feature on the valve body to prevent the valve from rotating with respect to the pipe components. The preferred flange welding step comprises welding each flange to the respective pipe only on the side of the flange facing a near end of the pipe, that is, the side which will face the valve body when the assembly is connected. The welding fills a chamfer area in order to provide sufficient strength in the pipe to flange weld.

In order to produce the alignment tubes the pipe flanges are preferably welded to the respective pipe segment at a point somewhat removed from the end of the pipe so as to leave a pipe extension protruding from the flange. After coating these unmachined pipe components, the method preferably includes turning down the outside of each pipe extension to form the alignment tubes and removing coating from a portion of the flange facing the near end of the respective pipe. This machined portion of the respective flange face comprises the flange sealing surface which cooperates with the respective valve sealing surface to form the desired sealing connection, with or without an O-ring.

These and other objects, advantages, and features of the invention will be apparent from the following description of the preferred embodiment, when considered with the accompanying drawings.

DESCRIPTION OF THE PREFERRED EMBODIMENTS

Figure 1:
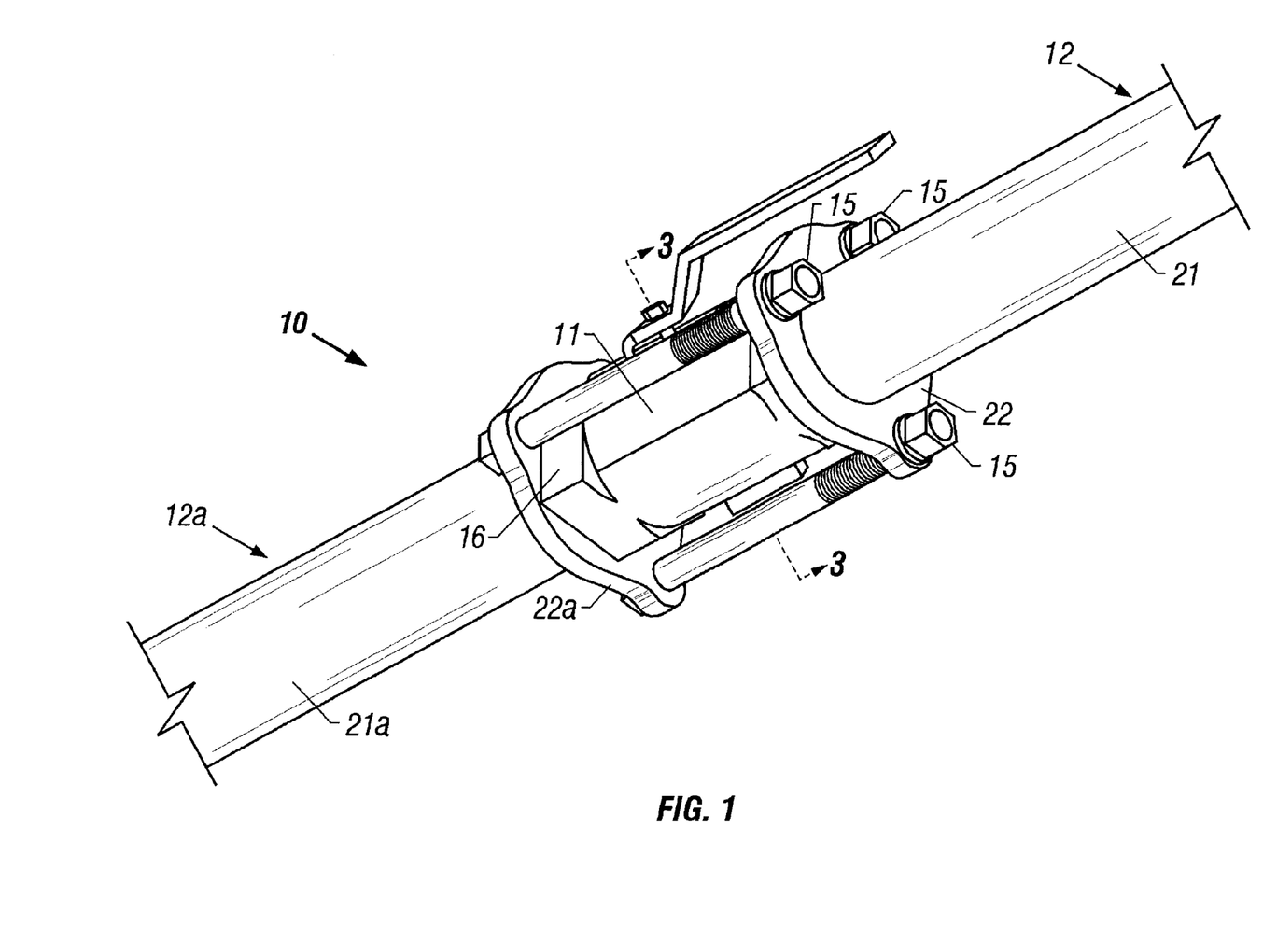
FIG. 1 is a view in perspective of a connected valve and pipe assembly embodying the principles of the invention.
Figure 2:
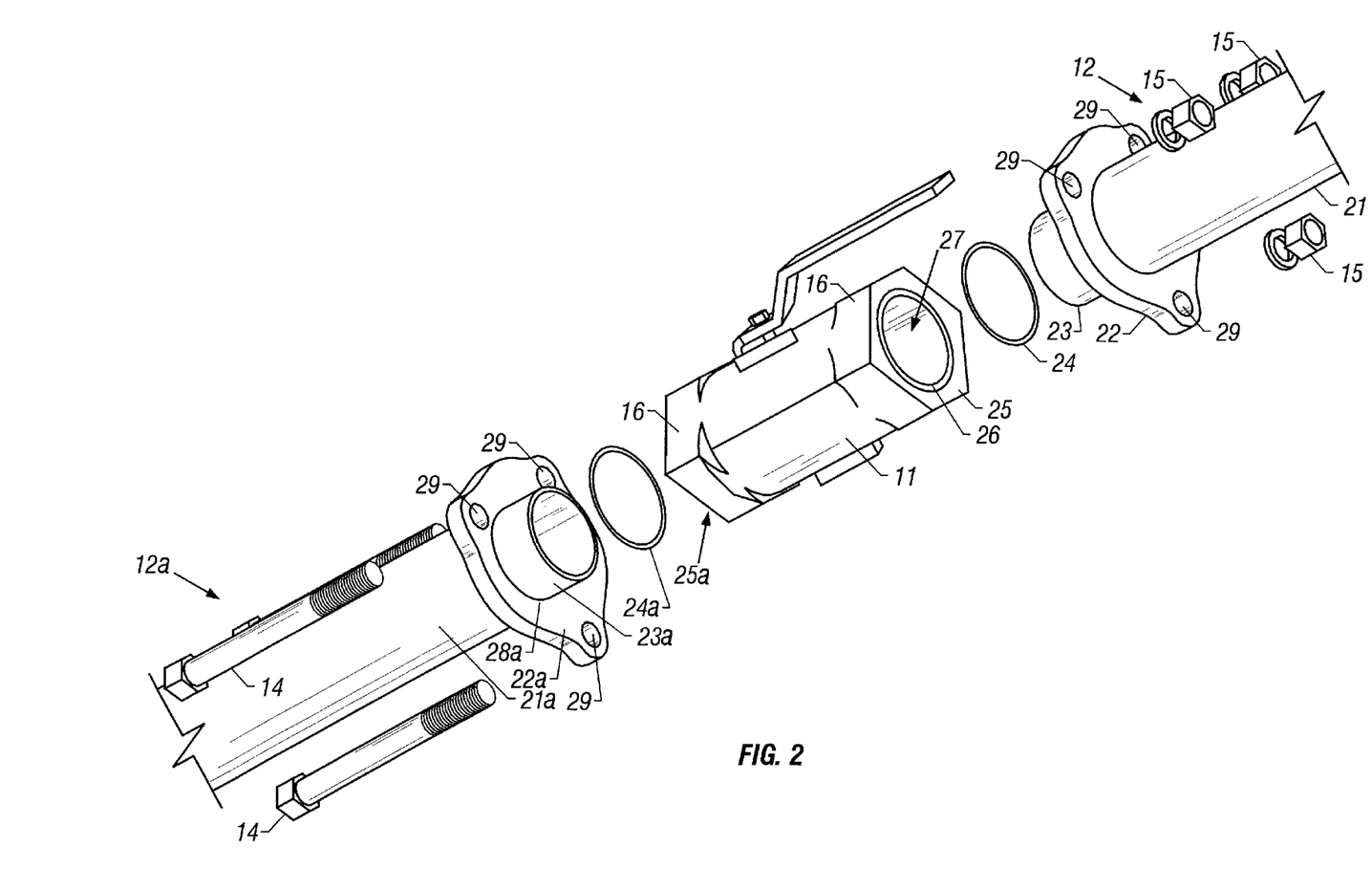
FIG. 2 is an exploded perspective view of the valve and pipe assembly, shown in FIG. 1.
Figure 3:
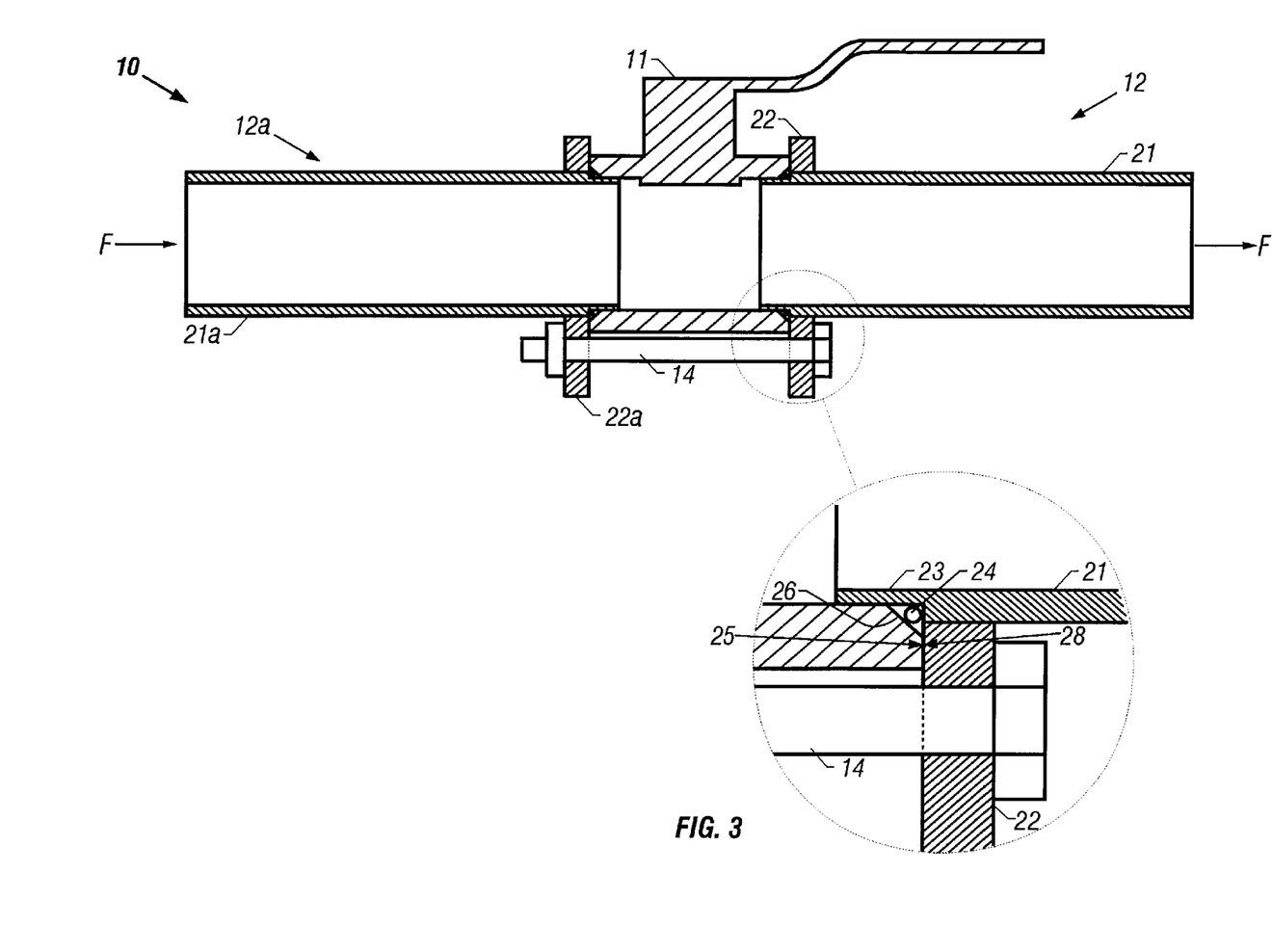
FIG. 3 is a view in section of the connected valve and pipe assembly, taken along line 3—3 in FIG. 1, and includes an enlarged view of a sealing connection at one end of the valve.

FIGS. 1 and 3 show a valve and pipe assembly 10, including a valve 11, a first pipe component 12, and a second pipe component 12a. Three bolts 14 and corresponding nuts 15 are used to connect the illustrated assembly 10. FIG. 1 shows the connected assembly 10, while FIG. 2 provides an exploded view of the valve and pipe assembly to better illustrate the various components included in the assembly. As shown best in the section view of FIG. 3, valve 11 is positioned between first pipe component 12 and second pipe component 12a, to define a flow path through valve and pipe assembly 10. This flow path is indicated at arrows F in FIG. 3.

As will be discussed further below, the first and second pipe components 12 and 12a are identical components connected on either end of valve 11. In this disclosure, each element associated with first pipe component 12 will include only a reference number while the corresponding element of the second pipe component will be referenced by the same number with the added suffix "a."

As shown in each of FIGS. 1–3, first pipe component 12 includes a first pipe 21 and first flange 22 connected so that the side of the flange facing away from the end the pipe (the near end of the pipe or end nearest the flange) meets the pipe at substantially a right angle. Second pipe component 12a similarly includes a second pipe 21a and second flange 22a also connected so that the side of the flange facing away from the near end of the pipe meets the pipe at a substantially right angle. As will be discussed in detail below with reference to FIGS. 4 through 9, pipes 21 and 21a and flanges 22 and 22a are made of carbon steel. The exposed carbon steel is coated with a suitable protective coating in the manufacturing process used to produce assembly 10. Although the invention encompasses any suitable protective coating, the preferred protective coating comprises galvanizing.

First component 12 in the preferred embodiment includes an alignment tube 23 shown in the exploded view of FIG. 2 and in FIG. 3. Alignment tube 23 is adapted to be inserted into a bore 27 in valve 11. Second component 12a also includes an alignment tube 23a which is also adapted to be inserted into bore 27 from the opposite end of valve 11. Alignment tubes 23 and 23a are used to help hold valve 11 in the proper position while the connection shown in FIGS. 1 and 3 is being made. FIG. 3 shows the position of alignment tubes 23 and 23a in the bore of valve 11 when the valve is in the connected position between components 12 and 12a.

Valve 11 according to the invention can be described best with reference to FIG. 2, and includes a first sealing surface 25 and a second sealing surface 25a on opposing ends of the valve body. It will be appreciated that second sealing surface 25a is facing away from the viewer in the perspective of FIG. 2 and an arrow is used to point to the location of the surface. When valve 11 is positioned in the connected position between first pipe component 12 and second pipe component 12a, first sealing surface 25 makes a sealing connection with a sealing surface 28 of first flange 22. This sealing connection is shown best in the enlarged portion of FIG. 3 with reference arrows being used to point to surfaces 25 and 28 rather than the normal lead lines since the surfaces are partially abutting surfaces. Although there is no enlarged view of the opposite end of valve 11, it will be appreciated that second sealing surface 25a also makes a corresponding second sealing connection with a sealing surface (28a in FIG. 2) of second flange 22a.

As indicated in the exploded view of FIG. 2, O-ring 24 can be included between the valve sealing surface 25 and the sealing surface on flange 22. O-ring 24a may also be included between valve sealing surface 25a and the sealing surface 28a on flange 22a. The enlarged portion of FIG. 3 shows O-ring 24 positioned between valve sealing surface 25 and flange sealing surface 28. In the preferred embodiment, each O-ring 24 and 24a is positioned adjacent to a peripheral inner chamfer which forms part of the respective valve sealing surfaces 25 and 25a. Both FIG. 2 and the enlarged portion of FIG. 3 show the chamfer 26 associated with valve sealing surface 25. This inner chamfer 26 extends around the circumference of valve bore 27. As shown in FIG. 3, chamfer 26 creates a circumferential recess area between the first valve sealing surface 25 and first flange sealing surface 28 when valve 11 is in the connected position with pipe component 12. This recess between first valve sealing surface 25 and first flange sealing surface 28 provides the preferred location for receiving O-ring 24. Although not shown in the drawings, it will be understood that a chamfer at the opposite end of valve 11 provides a similar recess for receiving O-ring 24a.

The illustrated form of valve 11 includes positioning features 16 on its outer surface as shown in FIGS. 1 and 2. When valve 11 is connected between components 12 and 12a as shown in FIG. 1, positioning features 16 cooperate with flange bolts 14 to prevent valve 11 from rotating on its longitudinal axis with respect to the components 12 and 12a. In the illustrated form of the invention, positioning features 16 comprise the corners of a hexagonal outer surface of the valve body. However, it will be appreciated that alternate forms of the invention may include other types of valve body features to interfere with bolts 14 so as to prevent the axial rotation of valve 11.

Valve and pipe assembly 10 also includes a flange connector arrangement. In the form of the invention illustrated in FIGS. 1–3, the flange connector arrangement includes bolts 14 and nuts 15. Each bolt 14 extends through a corresponding pair of bolt holes 29 formed in the opposing flanges 22 and 22a and is secured with one of the nuts 15. The figures show three bolts 14 connecting the two flanges 22 and 22a. However, it will be appreciated that more than three bolts may be used within the scope of the present invention as defined by the following claims. Also, the invention is not limited to connecting the two flanges 22 and 22a with bolts. Rather, any other suitable connecting arrangement may be used within the scope of the present invention.

Although the invention is not limited to any particular type of valve, valve 11 is preferably made of bronze. Utilizing a bronze valve in the valve and pipe assembly according to the invention allows the assembly to take advantage of the low cost and excellent corrosion resistance of such valves. Bronze valves are also uniquely suited for use in assembly 10 due to the way such valves are commonly manufactured. Since bronze valves are commonly manufactured with female threads at each end of the valve body rather than flanges, the ends of the valve body provide convenient sealing surfaces such as surfaces 25 and 25a shown in FIGS. 2 and 3. Although it is possible to use a bronze valve after the female threads have been tapped at each end of the valve, it is preferable to use valves that remain untapped.

Figure 4:
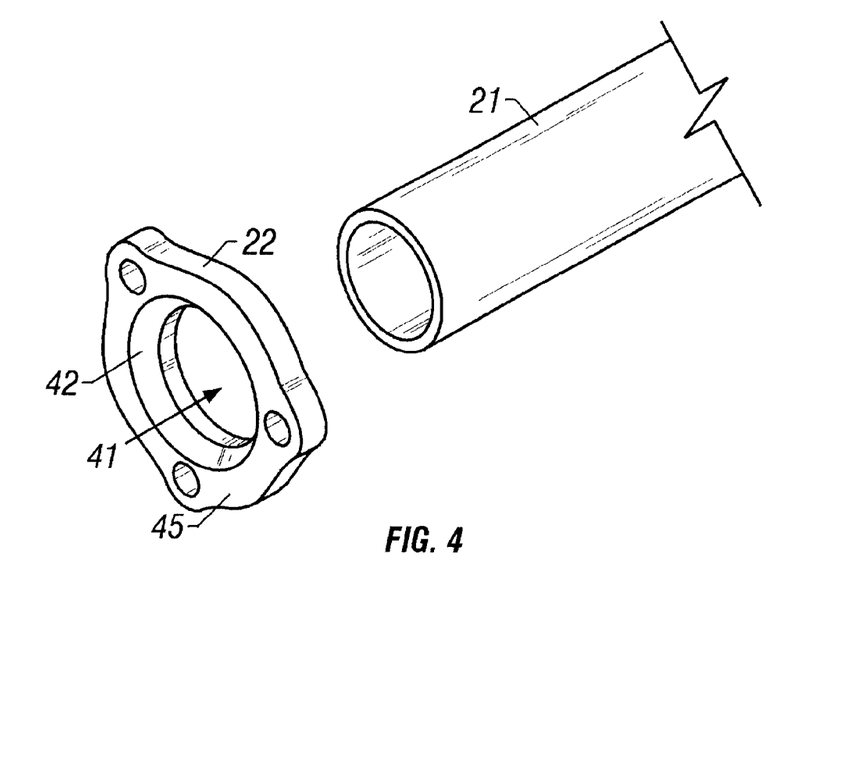
FIG. 4 is an exploded view in perspective of a flange and a pipe segment used to produce a coated pipe component according to the invention.
Figure 5:
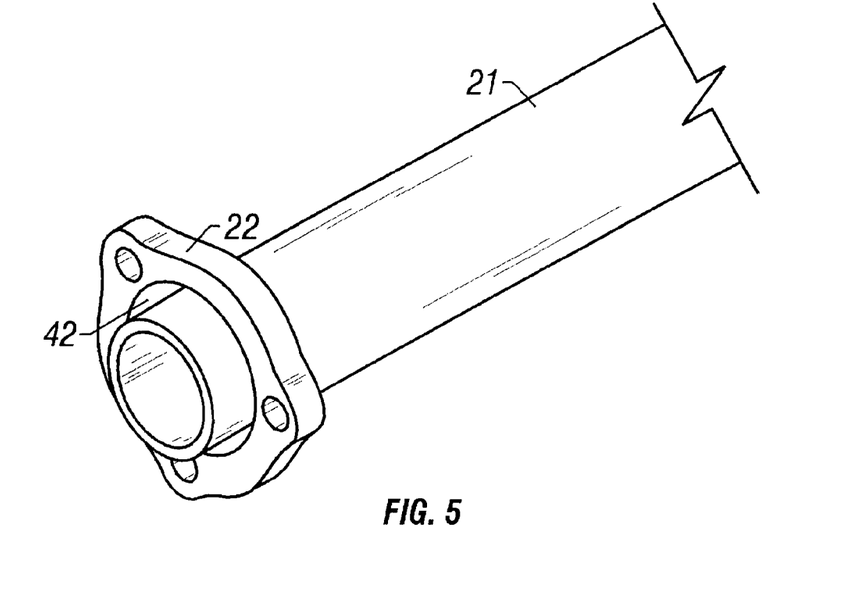
FIG. 5 is a view in perspective similar to FIG. 4, but with the flange located on the pipe in the position in which it will be welded.

The method of the invention will now be described with reference to FIGS. 4 through 9 which show the various stages of production for the coated pipe and flange component 12 from FIGS. 1–3. For convenience, FIGS. 4–9 refer only to component 12. It will be appreciated, however, that the second coated pipe and flange component 12a is substantially identical to component 12. Thus, the following description of first coated pipe and flange component 12 applies equally to the second pipe and flange component 12a. The same references numbers used to refer to the finished component 12 and various parts of the finished component will be used in FIGS. 4–9. However, it will be appreciated that the common reference numbers refer to the same element in various stages of production and that the similarly numbered elements may have different characteristics in different drawings. For example, FIGS. 4 and 5 show flange 22 prior to being connected to pipe 21 in contrast to FIGS. 1–3. Also, FIGS. 4 and 5 show both flange 22 and pipe 21 prior to being galvanized as the components are in FIGS. 1–3. The common reference numbering between the completed assembly figures (FIGS. 1–3) and the production process figures (FIGS. 4–9) is maintained in order to simplify the description and allow the reader to more easily recognize the various components in all of the figures.

Figure 6:
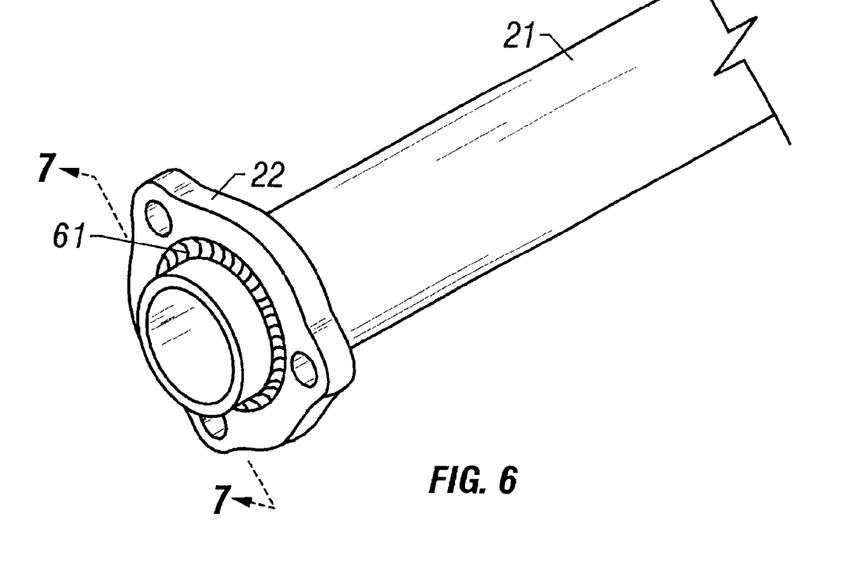
FIG. 6 is a view in perspective similar to FIG. 5, but with the flange welded to the pipe.

The manufacturing method according to the invention begins with the step of welding the respective flange 22 and 22a on its respective pipe segment 21 and 21a. In the example shown in FIGS. 4–6 for first pipe component 12, this step includes sliding flange 22 over an end of pipe 21 to the position shown in FIG. 5, and then welding the flange in that position as shown in FIG. 6. Flange 22 includes center opening 41 which is just large enough to receive pipe 21. Center opening 41 preferably has a chamfer 42 around its inner circumference. Chamfer 42 is preferably at a forty-five degree angle to the inside surface of center opening 41, and extends through approximately one-half of the thickness of the flange 22. The preferred chamfer 42 allows flange 22 to be welded to pipe 21 at only the side of the flange facing the near end of the pipe 21. That is, when the area defined by chamfer 42 is filled with weld material as shown at 61 in FIGS. 6 and 7, the weld is sufficiently strong to eliminate any weld between the flange 22 and pipe 21 on the opposite side of the flange from the side having chamfer 42. This welding arrangement facilitates positioning the bolts (14 in FIGS. 1–3) close to the outside diameter of pipe 21 by eliminating weld material which would otherwise interfere with tightening the bolts.

It will be apparent from FIGS. 4 and 5 that flange 22 is preferably welded to pipe 21 at a location which leaves a portion of pipe extending from a flange face 45. In one preferred form of the invention, pipe 21 extends approximately three-eighths of an inch from flange face 45. This pipe extension is used to form the alignment tube 23 as will be discussed below with reference to FIGS. 8 and 9.

Figure 7:
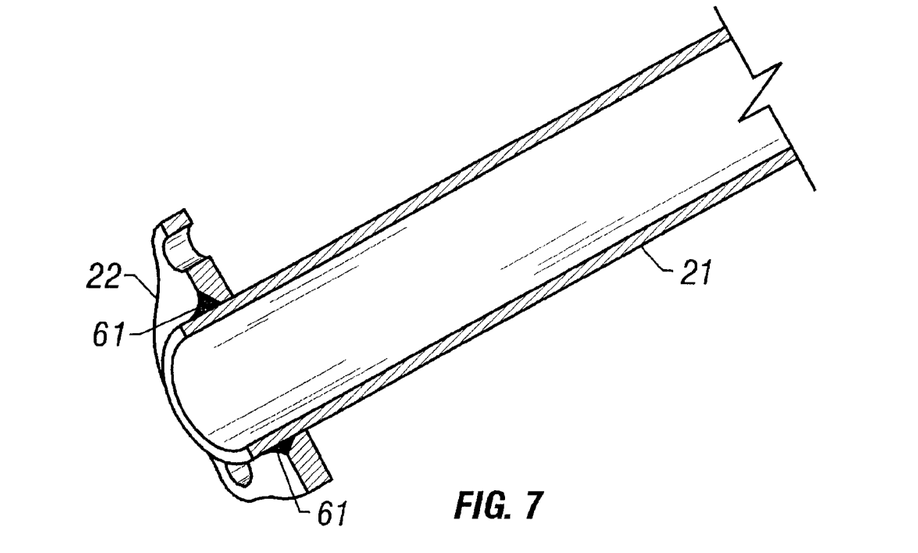
FIG. 7 is a view in perspective similar to FIG. 6 but showing a section taken along line 7—7 in FIG. 6.
Figure 8:
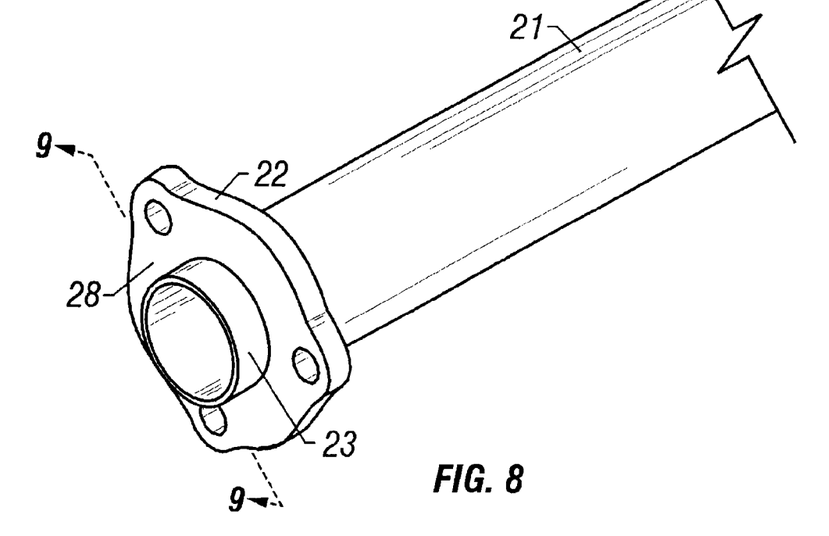
FIG. 8 is a view in perspective similar to FIG. 6 but showing the final coated component after coating and machining.
Figure 9:
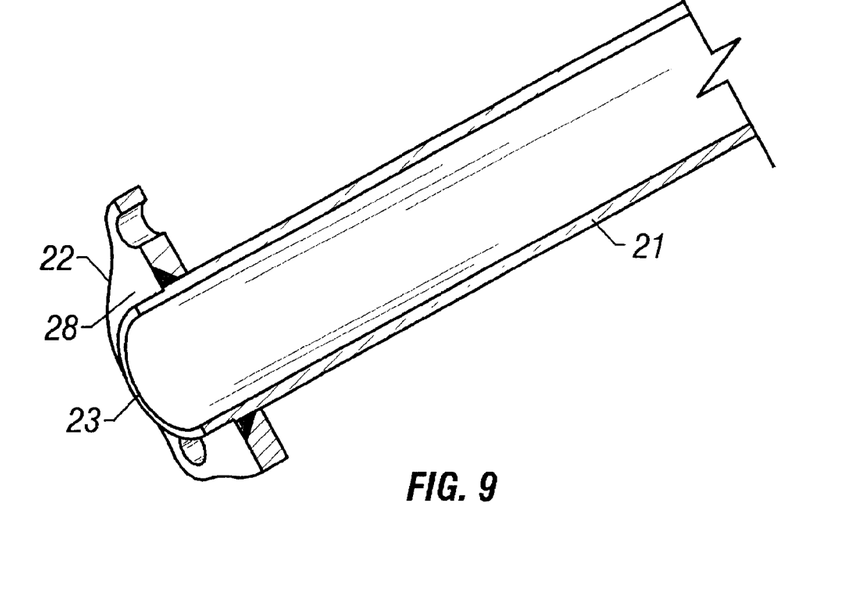
FIG. 9 is a view in perspective similar to FIG. 8 but showing a section taken along line 9—9 in FIG. 8.

Once flange 22 has been welded to pipe 21 to form the intermediate component shown in FIGS. 6 and 7, the entire intermediate component can be coated with a suitable protective coating. This coating step may be performed in any suitable manner to add the desired thin layer of protective coating material over the entire outer surface of pipe 21 and flange 22, including the exposed weld bead 61. The preferred coating step comprises galvanizing the intermediate component by cleaning the surface of the metal with first a caustic solution and then an acid solution, and then hot dipping the metal in a galvanizing bath to deposit a layer of zinc coating on all exposed surfaces. It is important that the coating step be performed only after the flange is welded to the respective pipe. This ensures that all welds are protected by a layer of coating material and also avoids the release of dangerous fumes which occurs when welding certain types of previously coated pipe.

Once the welded flange 22 and pipe 21 are coated, the manufacturing method continues with the step of machining the flange sealing surface in the component. The resulting machined flange sealing surface is shown at reference numeral 28 in FIGS. 8 and 9 (corresponding the surface 28a in FIG. 3). This sealing surface machining step is required to remove any weld material from bead 61 in FIGS. 6 and 7 which would interfere with the desired seal. It is generally preferable to machine away coating material and weld material to produce a sealing surface 28 which meets the pipe at generally a right angle to the longitudinal axis of the pipe. Machining the sealing surface 28 is also required to remove or smooth out the commonly uneven layer of coating material deposited on the base steel in the coating process.

The preferred form of the invention also includes machining or turning down the outside diameter of the pipe extension shown in FIGS. 6 and 7 to form the alignment tube 23. The reduced outside diameter of alignment tube 23 may be required to allow the tube to be inserted into valve bore 27 shown in FIGS. 2 and 3. Even where the diameter of the pipe need not be reduced to fit in valve bore 27, some machining of the coated extension from flange sealing surface 28 will commonly be required in order to correct for unevenly deposited coating material on the surface of the extension.

After both pipe components 12 and 12a have been produced as described with reference to FIGS. 4–9 for component 12, the manufacturing method according to the invention includes aligning valve 11 in the connected position between components 12 and 12a as shown best in FIG. 3. In this connected position, valve 11 is situated between first and second pipe components 12 and 12a so that sealing surfaces 25 and 25a at each end of valve 11 align with the sealing surfaces of the respective flanges 22 and 22a. The alignment tubes 23 and 23a cooperate with valve bore 27 to ensure that the valve is in the proper connected position.

With the valve in the connected position, the method includes connecting the first and second flanges 22 and 22a, respectively. This connection is preferably made through the bolts 14 and nuts 15 which may be tightened to pull the flanges 22 and 22a tightly into engagement with valve 11. The engagement forms a seal between the first flange 22 and the first valve sealing surface 25 at one end of valve 11, and forms another seal between the second flange 22a and the second valve sealing surface 25a at the opposite end of valve 11. The seals may be formed directly between the sealing surfaces or with the aid of an O-ring such as O-rings 24 and 24a.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the alignment tubes 23 and 23a are helpful in forming the desired connection, such alignment devices are not required in order to produce a valve and pipe assembly according to the invention. Also, the flanges 22 and 22a may be integrally formed with the respective pipe rather than separately formed and welded, or welded without using the preferred chamfer 42 shown in FIGS. 4 and 5.

What is claimed is:

1. A valve and pipe assembly including:
   (a) a valve having a first valve sealing surface at a first end and a second valve sealing surface at a second end;
   (b) a first pipe component having a first pipe and first flange secured to the first pipe;
   (c) a second pipe component having a second pipe and a second flange secured to the second pipe;
   (d) a flange connector arrangement connecting the first flange and the second flange together with the valve between the first flange and second flange to form a connected assembly, the connected assembly including a first sealing connection between the first valve sealing surface and the first flange and including a second sealing connection between the second valve sealing surface and second flange, the connected assembly further defining a flow path through the first pipe component, the valve, and the second pipe component; and
   (e) an alignment tube extending from at least one of the first flange or second flange into a bore of the valve in the connected assembly.

2. The assembly of claim 1 wherein:
   (a) the valve includes a number of positioning features located on an exterior surface thereof;
   (b) the flange connector arrangement includes a number of bolts, each bolt extending through a respective pair of bolt holes associated with the first flange and second flange; and
   (c) at least one of the bolts cooperates with the positioning features to limit the axial rotation of the valve with respect to the first and second pipe components.

3. The assembly of claim 2 wherein:
   (a) the first flange meets the outer surface of the first pipe at a substantially right angle around the circumference of the pipe at a side of the first flange facing away from the valve in the connected assembly; and
   (b) the second flange meets the outer surface of the second pipe at a substantially right angle around the circumference of the pipe at the side of the second flange facing away from the valve in the connected assembly.

4. The assembly of claim 1 wherein the alignment tube comprises a continuation of the respective first pipe or second pipe and having an outside diameter turned down to a diameter less than the outside diameter of the remainder of the respective first or second pipe.

5. The assembly of claim 1 further including:
   (a) an O-ring sealing element positioned between the first valve sealing surface and the first flange in the connected assembly; and
   (b) an O-ring sealing element positioned between the second valve sealing surface and the second flange in the connected assembly.

6. The assembly of claim 1 wherein each valve sealing surface includes a peripheral inner chamfer defining a recess area between the valve and respective first or second pipe component for receiving an O-ring sealing element.

7. A method of manufacturing a valve and pipe assembly, the method including the steps of:
   (a) welding a first flange to a first pipe to form a first component;
   (b) welding a second flange to a second pipe to form a second component;
   (c) applying a protective coating to the first component and second component;
   (d) after applying the protective coating to the first component, machining a first flange sealing surface in the first component;
   (e) after applying the protective coating to the second component, machining a second flange sealing surface in the second component;
   (f) aligning a valve in a connected position between the first flange sealing surface and the second flange sealing surface with a first valve sealing surface aligning with the first flange sealing surface and a second valve sealing surface aligning with the second flange sealing surface; and
   (g) connected the first flange and the second flange together with the valve in the connected position to provide a seal between the first flange sealing surface and the first valve sealing surface and to provide a seal between the second flange sealing surface and the second valve sealing surface.

8. The method of claim 7 wherein:
   (a) the step of welding the first flange to the first pipe includes producing a weld bead to fill a chamfer area on the first flange facing a near end of the first pipe; and
   (b) the step of welding the second flange to the second pipe includes producing a weld bead to fill a chamfer area on the second flange facing a near end of the first pipe.

9. The method of claim 7 wherein the step of applying the protective coating to the first component and second component comprises hot dip galvanizing an entire exterior surface of the respective component.

10. The method of claim 7 wherein:
    (a) the first component includes a pipe extension extending from a near end of the first pipe and further including the step of turning down the outside diameter of the first pipe extension to produce an alignment tube capable of being received in a bore of the valve; and
    (b) the second component includes a pipe extension extending from a near end of the second pipe and further including the step of turning down the outside diameter of the first pipe extension to produce an alignment tube capable of being received in the bore of the valve.

11. The method of claim 10 wherein:
    (a) the step of machining the first flange sealing surface includes removing protective coating on at least a portion of the face of the first flange facing the near end of the first pipe; and
    (b) the step of machining the second flange sealing surface includes removing the protective coating on at least a portion of the face of the first flange facing the near end of the first pipe.

12. The method of claim 10 wherein the step of aligning the valve in the connected position includes:
    (a) inserting the first alignment tube into a bore at one end of the valve; and
    (b) inserting the second alignment tube into a bore at the opposite end of the valve.

13. The method of claim 7 wherein the step of connecting the first flange and the second flange together with the valve in the connected position includes bolting the first flange and second flange together with a number of bolts, each bolt extending through a pair of aligned bolt holes in the first and second flanges.

14. The method of claim 13 further including the step of stabilizing the valve from rotation about its longitudinal axis with respect to the first component and second component by interference between at least one of the connecting bolts and at least one positioning feature on an exterior surface of the valve.

15. A valve and pipe assembly including:
(a) a bronze valve having a first valve sealing surface at a first end and a second valve sealing surface at a second end;
(b) a first galvanized component having a first flange secured to a first pipe at a substantially right angle, the first flange being secured in a position along the first pipe so that a continuation of the first pipe extends through the first flange and forms a first alignment tube;
(c) a second galvanized component having a second pipe and a second flange secured to the second pipe at a substantially right angle, the second flange being secured in a position along second pipe so that a continuation of the second pipe extends through the second flange and forms a second alignment tube; and
(d) a number of bolts connecting the first flange and the second flange together with the valve between the first flange and the second flange to form a connected assembly with the first alignment tube and the second alignment tube inserted in a bore in the valve, the connected assembly including a first sealing connection between the first valve sealing surface and the first flange and including a second sealing connection between the second valve sealing surface and the second flange, the connected assembly further defining a flow path through the first galvanized component, the valve, and the second galvanized component.

16. The valve and pipe assembly of claim 15 wherein the valve further includes positioning features that cooperate with the bolts to limit the rotation of the valve with respect to the first and second galvanized components about a longitudinal axis of the valve.

17. The assembly of claim 16 wherein:
(a) the first sealing connection includes an O-ring sealing element positioned between the first valve sealing surface and the first flange in the connected assembly, the O-ring being located in a recess defined by the first flange and a peripheral inner chamfer in the first valve sealing surface; and
(b) the second sealing connection includes an O-ring sealing element positioned between the second valve sealing surface and the second flange in the connected assembly, the O-ring being located in a recess defined by the second flange and a peripheral inner chamfer in the second valve sealing surface.

18. A valve and pipe assembly including:
(a) a valve having a first valve sealing surface at a first end and a second valve sealing surface at a second end;
(b) a first pipe component having a first pipe and first flange secured to the first pipe;
(c) a second pipe component having a second pipe and a second flange secured to the second pipe;
(d) a flange connector arrangement connecting the first flange and the second flange together with the valve between the first flange and second flange to form a connected assembly, the connected assembly including a first sealing connection between the first valve sealing surface and the first flange and including a second sealing connection between the second valve sealing surface and second flange, the connected assembly further defining a flow path through the first pipe component, the valve, and the second pipe component;
(e) an O-ring sealing element positioned between the first valve sealing surface and the first flange in the connected assembly; and
(f) an O-ring sealing element positioned between the second valve sealing surface and the second flange in the connected assembly.

19. A valve and pipe assembly including:
(a) a valve having a first valve scaling surface at a first end and a second valve sealing surface at a second end;
(b) a first pipe component having a first pipe and first flange secured to the first pipe;
(c) a second pipe component having a second pipe and a second flange secured to the second pipe;
(d) a flange connector arrangement connecting the first flange and the second flange together with the valve between the first flange and second flange to form a connected assembly, the connected assembly including a first sealing connection between the first valve sealing surface and the first flange and including a second sealing connection between the second valve sealing surface and second flange, the connected assembly further defining a flow path through the first pipe component, the valve, and the second pipe component; and
(e) wherein each valve sealing surface includes a peripheral inner chamfer defining a recess area between the valve and respective first or second pipe component for receiving an O-ring sealing element.

* * * * *